United States Patent Office 3,547,608
Patented Dec. 15, 1970

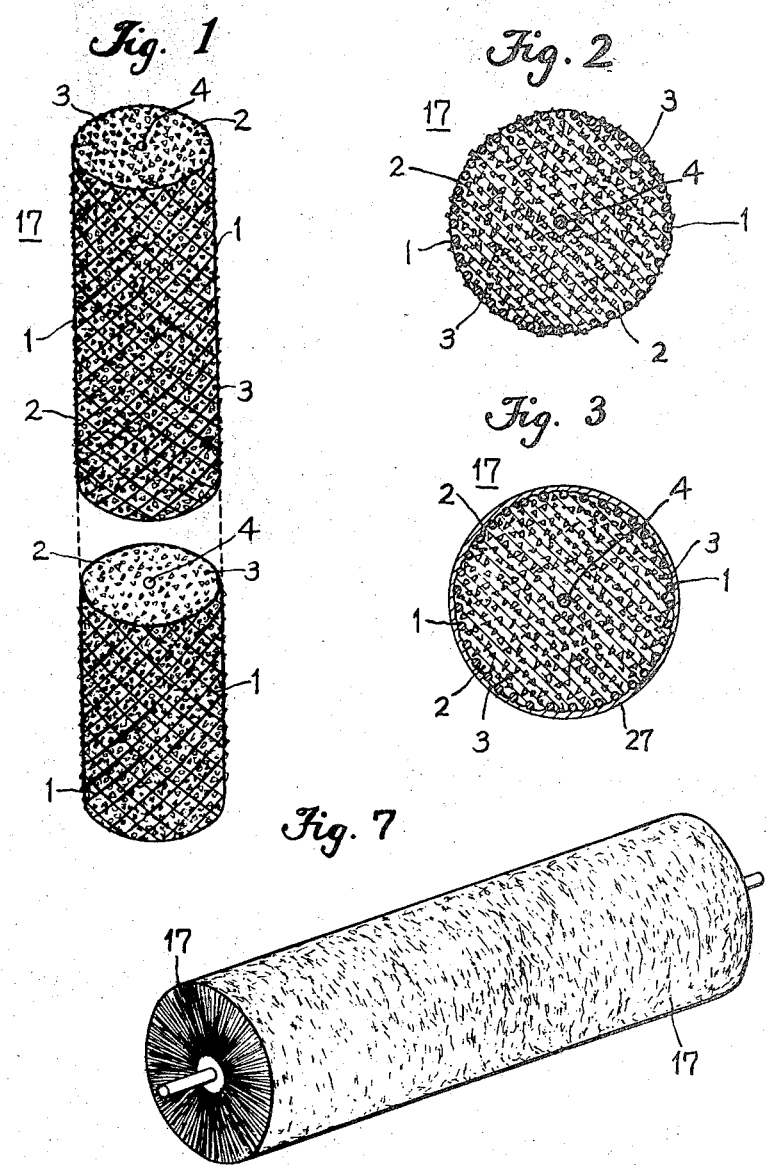

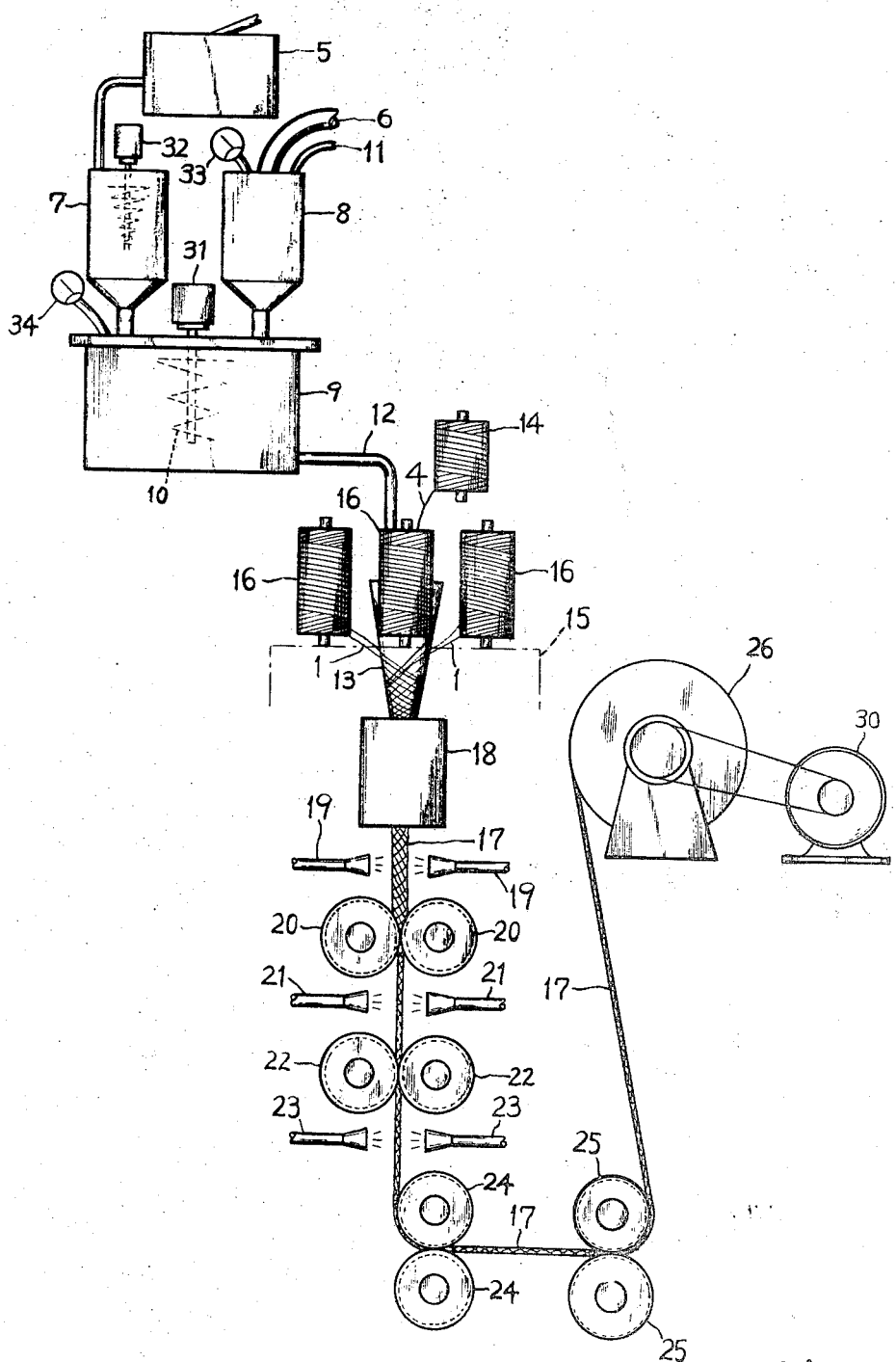

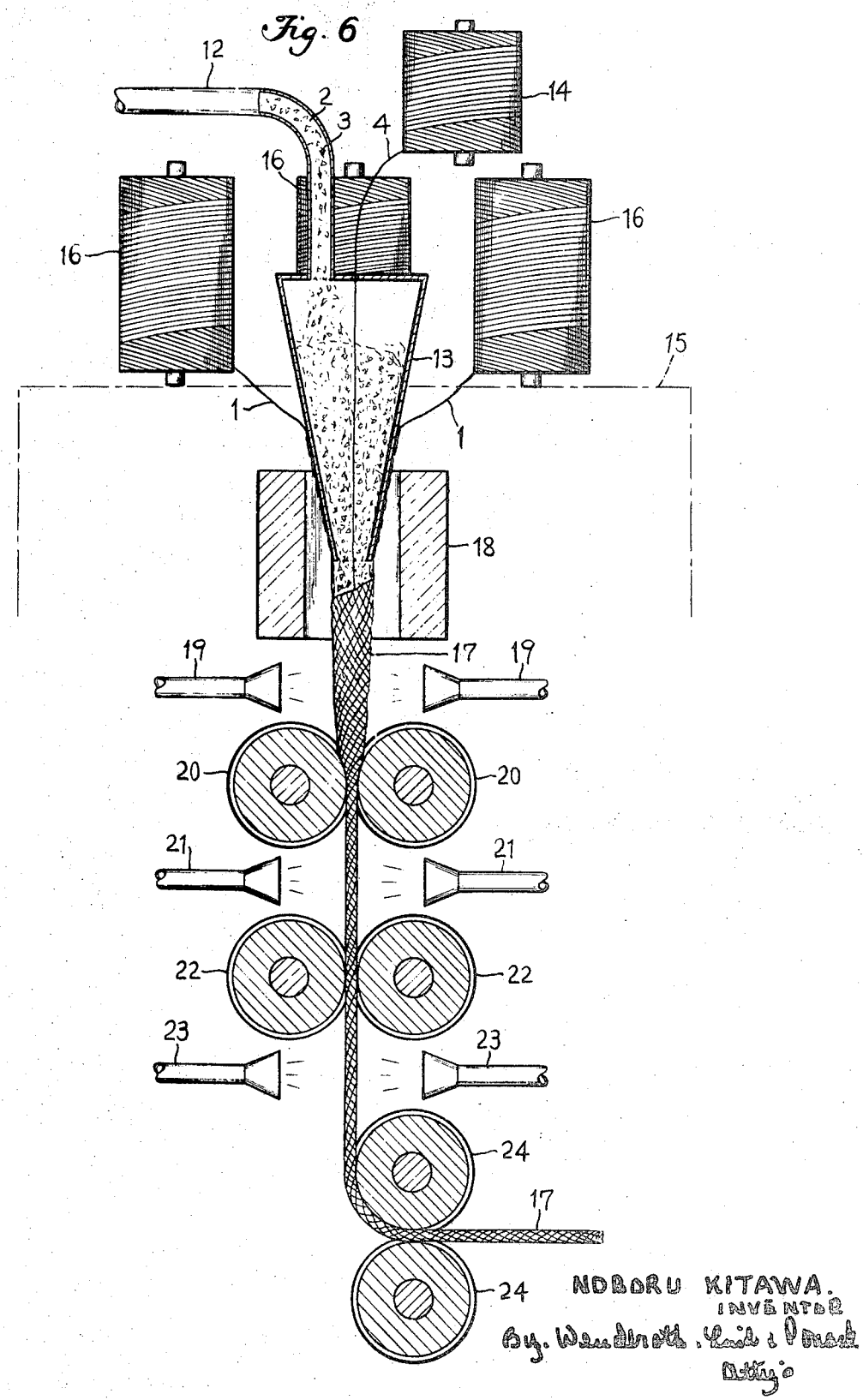

3,547,608
METHOD OF MANUFACTURING AN IMPREGNATED FIBROUS GRINDING ARTICLE
Noboru Kitazawa, 705 Daitakubo, Urawa-shi, Saitama-ken, Japan
Filed Nov. 8, 1967, Ser. No. 681,506
Claims priority, application Japan, Nov. 11, 1967, 42/74,340
Int. Cl. B24d 1/00, 11/02
U.S. Cl. 51—294       4 Claims

ABSTRACT OF THE DISCLOSURE

Novel grinding compositions are provided by mixing grinding particles with thermosetting adhesives and flowing the resultant mixture through a conical cylinder while weaving a single yarn or twisted thread consisting of natural fiber, synthetic fiber, mineral fiber or combinations thereof into a cylindrical form around the outside of said conical cylinder. As the woven material admixed with the synthetic adhesive resin is drawn from the conical cylinder, the resultant composition is heat cured to produce a grinding material of superior properties.

---

This invention relates to a grinding and polishing material to be used for the surface treatment of various metals, glass, stones, wood, synthetic resins, etc. It further relates to methods for the preparation thereof. More particularly, the present invention is concerned with a grinding material which comprises weaving a single yarn or twisted thread consisting of natural fiber, synthetic fiber and/or mineral fiber alone or in combination into a cylindrical form, with or without employing a core line therein, flowing thereinto the mixed solvent of grinding and polishing particles and thermo-setting synthetic resin adhesives which may have elasticity when one or more kinds of thermo-setting synthetic resins are modified or mixed and cured, and causing such solvent to be cured and further with or without making a film from foamed silicone resin or foamed phenol-modified epoxide resin or the mixture thereof. The invention further deals with methods for the preparation thereof.

The thermo-setting synthetic resin adhesives which may have elasticity when one or more kinds of thermo-setting synthetic resin are modified or mixed and cured shall be hereinafter simply referred to as "adhesives." The term "grinding material" as used herein denotes a grinding and polishing material. The term "grinding particles" as used herein denotes a grinding and polishing particle.

Sandpaper, buffer, grinder, wire brush, etc. have been heretofore used for surface treatment, such as, for example, grinding etc. They are made in such a manner as to paste grinding particles on paper, cotton cloth, etc. Or they are molding from grinding particles and paste. When they are used, paste deteriorates due to rubbing and grinding heat. The pasted grinding particles becomes loosened. When grinding, they tend to be abraded or scattered, and lower a grinding performance. It has been, therefore, difficult to use the conventional type of grinding materials for a long time. The present invention has overcome the aforementioned disadvantages.

The object of the present invention is to provide a grinding material which is excellent in its grinding and polishing performance and can be used for a long time without abrading or scattering grinding particles during grinding and polishing.

The accompanying drawings illustrate the preferred embodiment of the present invention.

FIG. 1 is a view in perspective of the grinding material of this invention.

FIG. 2 is a magnified view shown in cross section thereof. FIG. 3 is a magnified view shown in cross section of the grinding material prepared in accordance with the different method of this invention.

FIG. 4 is a diagram illustrating the manufacturing process of the grinding material shown in FIG. 2.

Figure 5:
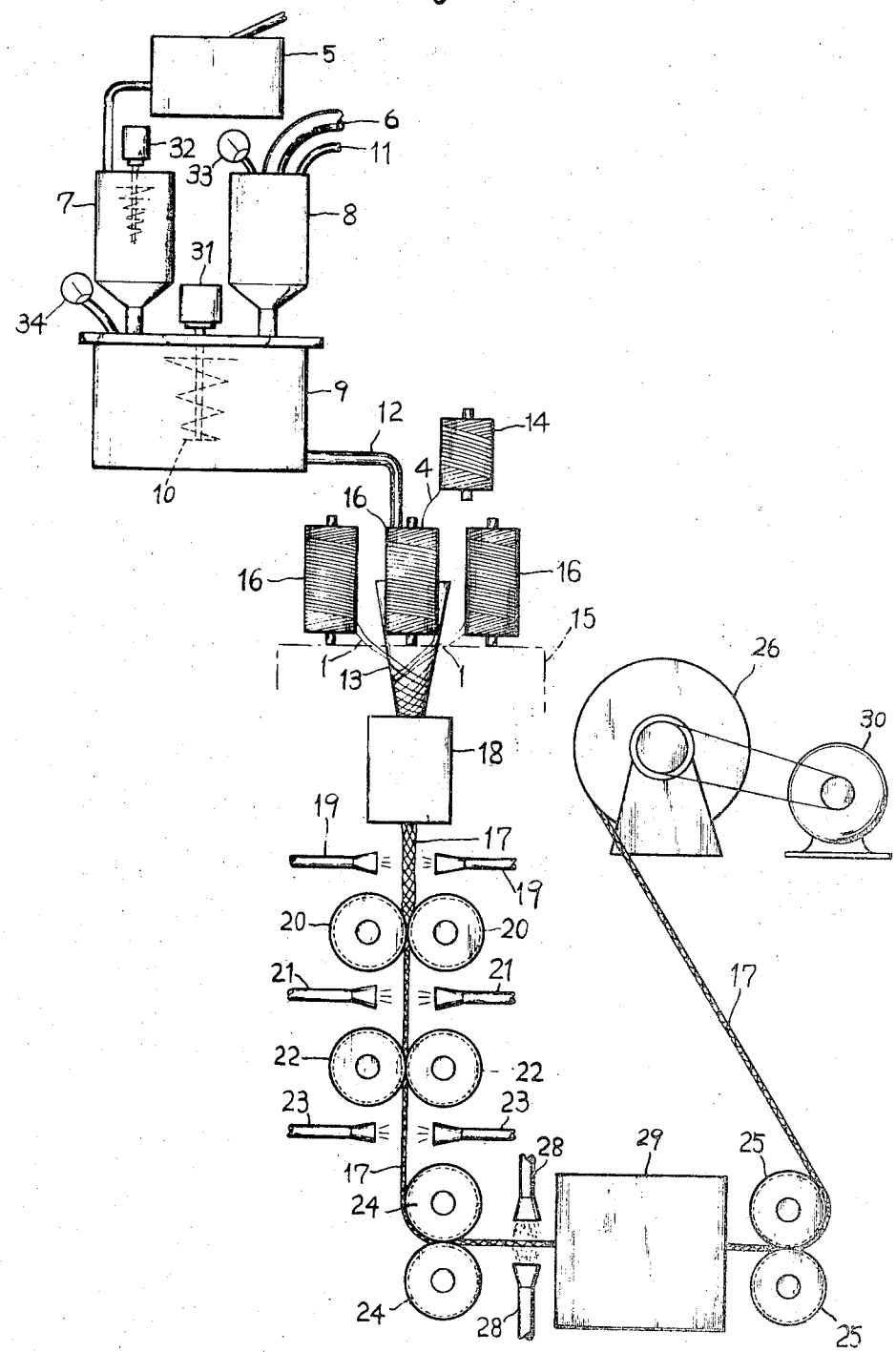

FIG. 5 is a diagram illustrating the manufacturing process of the grinding material shown in FIG. 3. FIG. 6 is a magnified view in cross section of essential parts which appear in FIGS. 4 and 5. FIG. 7 is a view in perspective of the grinding material of the present invention which is in use.

In describing the grinding material of the invention illustrated in FIGS. 1, 2 and 3, the number 1 designates a single yarn or twisted thread consisting of various kinds of fiber woven into a cylindrical form. Typical examples of fibers used alone or in combination include such natural fibers as cotton, hemp-palm, coconut palm, hemp, etc., such synthetic resins as polypropylene, polyester, nylon, etc. and such mineral fibers as asbestos, etc. The number 2 designates thermo-setting synthetic resin adhesive having elasticity when cured. Those which are used as such include polyester resin, polyurethane resin, phenol resin, epoxide resin, nitril synthetic rubber, etc. which are modified or mixed alone or in combination.

The number 3 designates grinding and polishing particles. Those used as such are various emery powder, silicone carbide, artificial diamond powder, etc.

The number 4 designates a core material. Those used as such are core line, a core thread, etc.

FIG. 4 illustrates the method of preparing the grinding material shown in FIG. 2.

Grinding particles are sent from a supply tank 5 into a particle tank 7. Adhesives are sent through a duct 6 into an adhesive tank 8. Further, grinding particles and adhesives are sent, at a certain mixing rate, into a stirring and mixing tank 9 from said particle tank 7 and adhesive tank 8, and stirred and mixed by a screw 10.

Then, the grinding particles and adhesives thus stirred and formulated are guided, by means of air pressure coming through an air-duct 11 positioned above the stirring and mixing tank 9, through a pipeline 12 positioned below, to the top of a conical cylinder 13 and then caused to enter said conical cylinder 13 and flow out of the bottom thereof together with a core line 4 hanging from a core thread reel 14 positioned above said conical cylinder 13. Further, weaver 15 is established around conical cylinder 13. Said weaver 15 is provided with reels 16 on which various kinds of single yarn of twisted thread are wound, and constructed in a manner to weave them into cylindrical form around the outer side of conical cylinder 13. The woven cylinder will be downwardly drawn out, holding therein core line 4 and the mixture of grinding particles and adhesives extracted from within said conical cylinder 13.

In order to cure the grinding material prepared in such manner as mentioned above, this is caused to pass successively through a heating cylinder 18, in between hot blast nozzles 19, molding rolls 20, again hot blast nozzles 21, molding rolls 22, and further again hot blast nozzles 23. Thus, the grinding material 17 is cured in such a state as to have elasticity. As shown in FIG. 4, the material is drawn out by means of draw-out rolls 24 and taken up rolls 25 on winding apparatus 26.

In this way, the grinding material as shown in FIG. 2 is obtained.

Further, another manufacturing method involves the additional process of forming film 27 consisting of foamed silicone resin or foamed phenol-modified epoxide resin or the mixture thereof, as shown in FIG. 3, over the grinding material manufactured in a manner as mentioned above. After the grinding material is manufactured, in a manner as described above, foamed silicone resin or foamed phenol-modified epoxide resin or the mixture thereof is, as shown in FIG. 5, blasted to this material through blast nozzles 28 after passing in between drawout rolls 24. Thereafter, it may be caused to pass through dryer 29 and be wound through take-up rolls 25 on winding apparatus 26. In employing the grinding material prepared as mentioned above to grind various metals, glass, stones, synthetic resins, it is formed into a rotating brush as shown in FIG. 7. The grinding and polishing are performed by rotating the rotating brush. The number 30, 31 and 32 designate a motor in the drawing. The numbers 33 and 34 designate a pressure gauge therein.

The following examples are offered by way of illustration and not by way of limitation.

Then, an explanation shall be made as to the grinding material embodying the present invention and its test result.

(1) Adhesives (percent by weight)
  (a) Polyurethane resin—60
  (b) Phenol-modified epoxide resin—25
  (c) nitrile synthetic rubber—10
  (d) Polyamide resin—5
(2) Grinding particles (percent by weight)
  (a) Aluminum oxide, mesh #60—80
  (b) Emery, mesh #65—20
(3) Knitting and weaving yarn and thread
  (a) Glass fiber twisted thread:
    Thickness—0.6 mm.
    Twist number—4.5
  (b) Jute twisted thread:
    Thickness—0.4 mm.
    Twist number—3.8

The aforementioned materials are employed. The grinding materials are prepared, in the second process as mentioned above, by stirring and mixing adhesives with grinding particles at the ratio of 1 to 1.5 (by weight). For the curing purpose, it is maintained at 90° C. for 20 minutes before the formation of the film consisting of foamed silicone resin and foamed phenol modified epoxide resin, and at 160° C. for 60 minutes after the formation thereof. The grinding material thus prepared is hardened, but has considerable elasticity.

The prepared material is formed into such a rotating brush as shown in FIG. 7. This has been used for grinding and polishing stainless steel disc, 2.2 mm., thick.

The result thereof is as mentioned below.

(1) Grinding material (rotating brush), width—200 mm.
(2) Grinding material (rotating brush), diameter—280 Φmm.
(3) Grinding width—200 mm.
(4) Grinding speed—15 m./min.
(5) Turning speed of rotating brush—3,200 r.p.m.
(6) Grinding depth—0.15–0.25 mm.
(7) Heat of grinding object due to grinding—35° C.–45° C.

Then, an explanation shall be made as to the grinding material embodying the present invention and its test result.

(1) Adhesives
  (a) Phenol-modified epoxide resin—50 g.
  (b) Phenol-modified nitrile rubber—40 g.
  (c) Hexamine (curing accelerator)—2 g.
  (d) Polyester resin—10 g.
  (e) Methyl ethyl ketone (M.E.K.) (solvent)—50 g.
  (f) Toluene (solvent)—50 g.
  (g) Water—3 g.
(2) Grinding particles
  (a) Aluminum oxide, mesh #300—80 g.
  (b) Emery, mesh #320—20 g.
(3) Weaving or knitting yarn and thread
  (a) Glass fiber twisted thread:
    Thickness—0.6 mm.
    Twist number—3.8
  (b) Nylon-tetron mix-spinning twisted thread (each 50%)
    Thickness—0.2–0.3 mm.
    Twist number—11
  (c) Jute twisted thread:
    Thickness—0.6 mm.
    Twist number—4.8

The grinding materials are prepared, in the second process as mentioned above, by stirring and mixing adhesives with grinding particles at the ratio of 1 to 1.5 (by weight). The grinding material thus prepared is formed into such a grinding material thus prepared is formed into such a rotating brush as shown in FIG. 7. This has been used for grinding and polishing stainless cold rolling steel plate, 1.6 mm. thick. The result thereof is as mentioned below.

(1) Grinding material (rotating brush), width—200 mm.
(2) Grinding and polishing material (rotating brush), diameter—280 Φmm.
(3) Grinding width—200 mm.
(4) Grinding speed—15 m./min.
(5) Turning speed of rotating brush—3,200 r.p.m.
(6) Grinding depth—0.01 mm.
(7) Heat of grinding object due to grinding—32° C.–36° C.

It is understood from the aforementioned test results that the present invention has such advantage as improved and more efficient grinding performance. Another advantage is that grinding materials would not scatter. In other words, the grinding particles are caused to be completely fixed because of thermo-setting synthetic resin adhesives applied. It is not deteriorated due to rubbing heat. Grinding materials have been heretofore abraded or scattered due to the deterioration of adhesives resulting from rubbing heat. But grinding materials are not abraded or scattered under the present invention. Therefore, the grinding materials are gradually worn out without lowering grinding performance. They can continue to maintain a well-balanced grinding performance for a long time.

The grinding materials have an excellent durability in that they are protected by the various fibers woven around them and have elastic thermo-setting synthetic resin adhesives cured therein. They can well endure a high speed grinding resulting from a high speed rotation. Further, the single yarn or twisted thread of natural fiber, synthetic fiber or mineral fiber woven into a cylindrical form has also grindability. Such grindability is combined with that of grinding particles. Thus, the surface of grinding object can be smoothed.

Moreover, it is possible to manufacture grinding materials, in a large quantity, in a simple manner in accordance with the manufacturing process of this invention.

Furthermore, it is possible to provide the grinding materials having thermal resistance, abrasion resistance and durability by forming a film of foamed silicone resin, foamed phenol-modified epoxide resin or the mixture thereof over the outer side of the grinding materials in accordance with the second manufacturing process.

The grinding material of this invention is molded in a cylindrical form. It is to be understood that the form of the invention herewith shown and described is to be taken as a preferred embodiment. Various changes may be made in the shape, size and arrangement of elements. For example, if molding rolls 20 and 22 are constructed in a manner to manufacture a belt-shape product, the grinding material may be made in a belt form, instead of a cylindrical form.

What I claim is:
1. A process for manufacturing a grinding article which comprises mixing grinding particles, selected from the group consisting of emery, aluminum oxide, diamond powder and silicon carbide with thermosetting adhesive resins, elastic when cured, selected from the group consisting of polyesters, polyurethanes, epoxides, nitrile synthetic rubber and mixtures thereof, causing such mixture to flow through a conical cylinder while weaving a single yarn or twisted thread selected from the group consisting of natural fibers, synthetic fibers, mineral fibers, and combinations thereof into a cylindrical form around the outer side of said conical cylinder said mixture flowing into said cylindrical form and molding and heat curing the resultant mixture in said cylindrical form while drawing it out of the conical cylinder.

2. A process as in claim 1 wherein the thermosetting resin and grinding material mixture are passed out of the conical cylinder together with a core material which is a thread or line.

3. A process as in claim 1 wherein a film of foamed silicone resin is formed by means of blasting or dipping the grinding article after molding and heat curing.

4. A process as in claim 2 wherein a film of foamed silicone resin is formed by means of blasting or dipping the grinding article after molding and heat curing.

References Cited

UNITED STATES PATENTS

| | | | |
|---|---|---|---|
| 2,958,593 | 11/1960 | Hoover | 51—298 |
| 3,091,019 | 5/1963 | Wetterau | 264—47 |
| 3,261,675 | 7/1966 | Cameron | 51—295 |
| 3,298,884 | 1/1967 | Willy | 264—47 |
| 3,377,151 | 4/1968 | Lanham | 51—295 |

DONALD J. ARNOLD, Primary Examiner

U.S. Cl. X.R.

51—295, 296, 298